United States Patent
Mulholland et al.

(10) Patent No.: US 11,797,208 B2
(45) Date of Patent: Oct. 24, 2023

(54) BACKEND DEDUPLICATION AWARENESS

(71) Applicant: INTERNATIONAL BUSINESS MACHINES CORPORATION, Armonk, NY (US)

(72) Inventors: Miles Mulholland, Eastleigh (GB); Eric John Bartlett, Chard (GB); Dominic Tomkins, Alton (GB); Alex Dicks, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 17/478,046

(22) Filed: Sep. 17, 2021

(65) Prior Publication Data
US 2023/0089939 A1    Mar. 23, 2023

(51) Int. Cl.
*G06F 3/06* (2006.01)

(52) U.S. Cl.
CPC ............ *G06F 3/0641* (2013.01); *G06F 3/061* (2013.01); *G06F 3/0608* (2013.01); *G06F 3/0679* (2013.01)

(58) Field of Classification Search
None
See application file for complete search history.

(56) References Cited

U.S. PATENT DOCUMENTS

| | | |
|---|---|---|
| 8,935,446 B1 | 1/2015 | Shilane |
| 10,268,697 B2 | 4/2019 | Lambright |
| 10,705,733 B1 * | 7/2020 | Smaldone ............... G06F 3/067 |
| 2016/0179410 A1 * | 6/2016 | Haas ..................... G06F 3/0655 714/6.24 |
| 2017/0249246 A1 * | 8/2017 | Bryant ............... G06F 16/2219 |
| 2020/0104065 A1 * | 4/2020 | Chen ..................... G06F 3/0689 |
| 2021/0103521 A1 | 4/2021 | Moore |

OTHER PUBLICATIONS

Disclosed Anonymously, "Method for Reference Count Management in a Deduplicated Storage System", IP.com No. IPCOM000243111D, Publication Date: Sep. 15, 2015, 7 Pages.
Mell et al., "The NIST Definition of Cloud Computing", Recommendations of the National Institute of Standards and Technology, NIST Special Publication 800-145, Sep. 2011, 7 pages.

* cited by examiner

*Primary Examiner* — Michael Alsip
(74) *Attorney, Agent, or Firm* — Rakesh Roy

(57) ABSTRACT

A method, computer system, and a computer program product for providing backend deduplication awareness at a virtualizing layer is disclosed. The present invention may include receiving a deduplication information from a backend storage controller associated with performing an input/output (IO) operation to a physical address of a disk. The present invention may include translating the physical address to a logical address to apply to a plurality of storage extents in a virtualizing layer. The present invention may include constructing a graph including corresponding nodes representing the plurality of storage extents and including corresponding deduplication edge weights representing a plurality of deduplications between the plurality of storage extents. The present invention may include identifying at least one subgraph within the constructed graph, wherein the identified at least one subgraph represents a storage extent cluster that is suitable for garbage collection as a cluster.

18 Claims, 9 Drawing Sheets

BACKEND DEDUPLICATION AWARENESS

BACKGROUND

The present invention relates to storage systems, and more specifically, to storage systems using backend deduplication.

Block storage systems may use storage virtualization where a number of backend storage systems may be connected via a Storage Area Network (SAN) to a storage controller or some other storage appliance providing a forward lookup structure to map allocated ranges to the physical storage medium. The backend storage systems may be local to the appliance running the software or maybe connected externally. The backend storage system may consist of a number of physical drives that may be spinning disk or more commonly, flash based storage which are configured in a RAID (Redundant Array of Inexpensive Disks) format.

Many storage vendors internally use a log-structure array (LSA) structure to describe the logical-to-physical layout of block devices in a storage system. LSA structures are used in storage systems because they offer an easy way to implement many different data reduction techniques and are agnostic about the type of storage backend. LSA storage systems use logical block addressing of logical block addresses (LBAs) in a virtual domain to reference physical addresses at a storage backend. The host only needs to provide the LBA without knowing anything of the physical backend.

Thin provisioning in storage systems allows the implementation of advanced space saving techniques, such as compression and deduplication as one need only update the forward lookup structure with the appropriate details.

Data deduplication works by identifying repeated data patterns and instead of storing the user data, it will create a reference to the duplicate data that is stored elsewhere in the system. It may be that the existing duplicate is within the same volume, another volume (either in the same pool or another pool within the storage system), or a volume used by another host.

In deduplication, data is broken into standardized units referred to as data chunks that can be examined for duplicates; these chunks may be files or more granular components such as blocks or volumes. Each chunk must be identified in a way that is easily comparable and this is handled by using a parity calculation or cryptographic hash function that gives the chunks shorter identifiers known as hash values, digital signatures, or fingerprints. These signatures are stored in an index where they can be compared quickly with other signatures to find matching chunks.

At the physical backend, new space may be allocated and garbage may be collected due to the movement of the stored data across the backend. As space is freed and reused, the old locations for a given LBA may be overwritten with data for another LBA.

SUMMARY

Embodiments of the present invention disclose a method, computer system, and a computer program product for providing backend deduplication awareness at a virtualizing layer. The present invention may include receiving a deduplication information from a backend storage controller associated with performing an input/output (IO) operation to a physical address of a disk. The present invention may include translating the physical address to a logical address to apply to a plurality of storage extents in a virtualizing layer. The present invention may include constructing a graph including corresponding nodes representing the plurality of storage extents and including corresponding deduplication edge weights representing a plurality of deduplications between the plurality of storage extents. The present invention may include identifying at least one subgraph within the constructed graph, wherein the identified at least one subgraph represents a storage extent cluster that is suitable for garbage collection as a cluster.

According to at least one embodiment of the present disclosure, the computer readable storage medium may include a non-transitory computer readable storage medium and the computer readable program code may be executable by a processing circuit.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Embodiments of the present disclosure are described to provide backend storage deduplication information to a virtualization layer. According to one embodiment, this backend storage deduplication information may be used to construct an extent-relationship graph to indicate which extents are related to one another due to deduplication.

In one embodiment, this deduplication information may be used by the virtualization layer to inform which extents should be migrated or garbage collected together. This may allow the virtualization layer to determine in which ranges to prioritize migration and garbage collection of in order to maximize reclaimed physical capacity.

Figure 1:
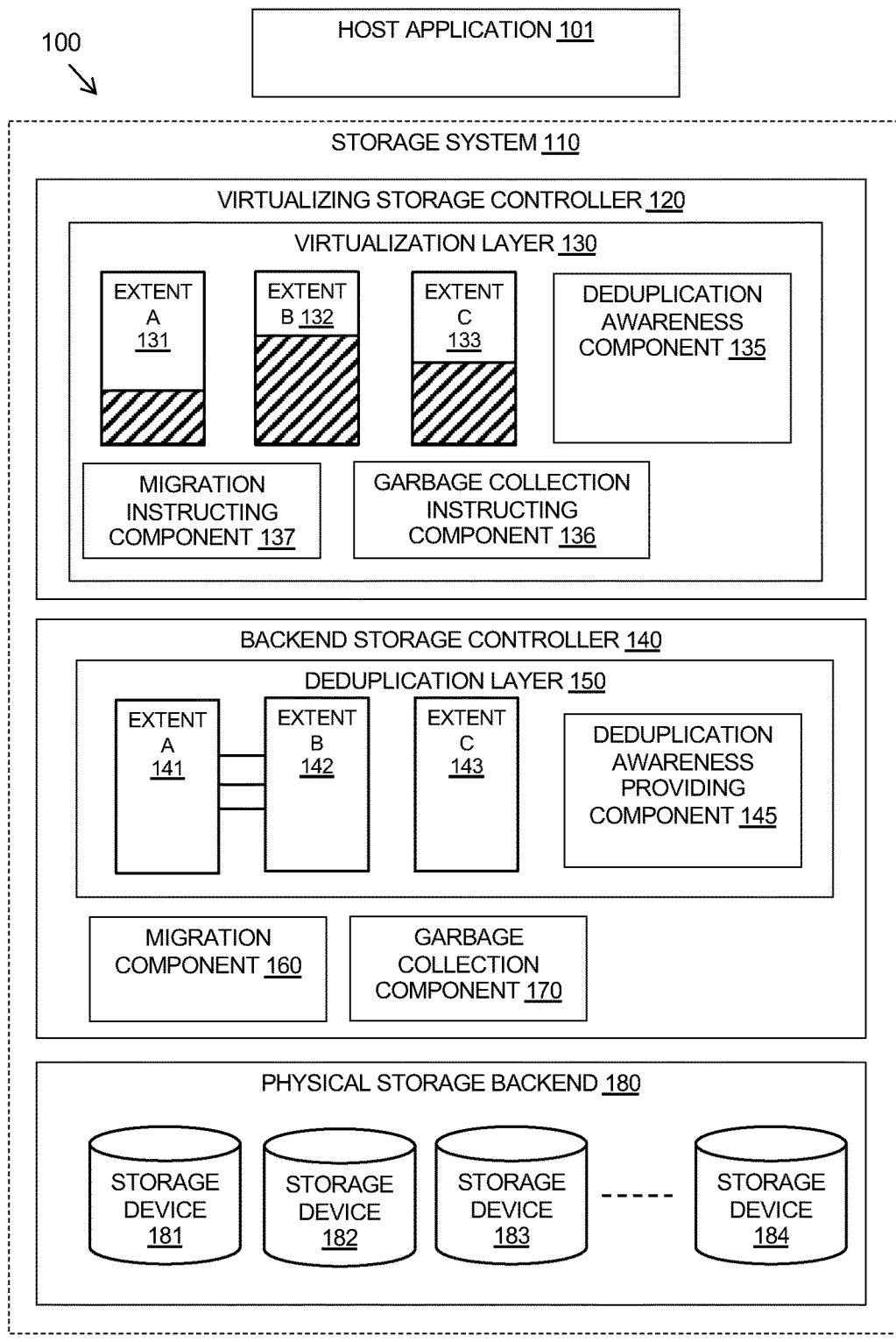
FIG. 1 is a block diagram of an example embodiment of a storage system according to at least one embodiment.

Referring to FIG. 1, a schematic diagram 100 illustrates an example embodiment of a storage system 110 in which the described embodiments may be implemented.

According to one embodiment, the storage system 110 may provide storage for a host application 101 at one more host server(s) having storage interfaces through which IO operations may be handled for writing and reading data to and from the storage system 110.

According to one embodiment, the storage system 110 may include a backend storage controller 140 and a physical storage backend 180. The physical storage backend 180 may provide physical disk storage across an array of physical storage devices 181-184 of non-volatile storage media. The backend storage controller 140 may include a deduplication layer 150 for deduplication of the physical storage backend 180. In one embodiment, a managed disk may be maintained by the backend storage controller 140 as a logical unit of physical storage that is not visible to a host and which is divided into chunks of equal size called extents. According to one embodiment, extents may include a unit of mapping that provides the logical connection between managed disks and volume copies.

According to one embodiment, the backend storage system controller 140 may also include a migration component 160 for controlling migration of the stored data and a garbage collection component 170 for garbage collection of storage extents in the physical storage backend 180.

According to one embodiment, the storage system 110 may include a virtualizing storage controller 120 providing a virtualizing layer 130. In one embodiment, the virtualizing storage controller 120 may maintain the virtualization layer 130 in which logical metadata of logical block addresses (LBAs) are mapped to references of physical addresses at which the host data is stored at a physical storage backend 180. In one embodiment, a storage pool may be allocated at the virtualizing storage controller 120 for a host application 110.

For example, storage extents 131-133 are illustrated in FIG. 1 in the virtualization layer 130 with their fullness shown in diagonal hashing. In this example, extent A 131 is the least full, followed by Extent C 133, and with Extent B 132 being the most full. The deduplication layer 150 similarly illustrates the same extents 131-133 and shows that Extent A 131 has strong dependencies on Extent B 132.

In one example, given a choice of garbage collecting a single extent 131-133, a naive virtualization layer 130 may choose to garbage collect Extent A 131 as the virtualization layer 130 may believe that this extent is the emptiest. However, the deduplication layer 150 may indicate that Extent A 131 has strong dependencies on Extent B 132; thus, until it is chosen to garbage collect both extents, it is possible that no capacity may actually get freed on the backend storage system controller 140.

The disclosed embodiments may provide the virtualization layer 130 with deduplication information from the deduplication layer 150 of the backend storage controller 140. In one embodiment, the virtualization layer 130 with the deduplication information may determine that Extent C 133 is the cheapest to garbage collect.

According to one embodiment, a deduplication awareness providing component 145 at the deduplication layer 150 may include functionality to provide deduplication information. When an IO is performed, if the deduplication layer 150 recognizes that the owner of this IO owns the storage which the reference is deduplicated against, it can notify the issuer that a deduplication has been created and the associated physical address.

A deduplication awareness component 135 at the virtualizing storage controller 120 may use these details to construct a graph of relationships between extents, which in turn can be used to group together storage extent clusters (e.g., clusters of related storage extents). A garbage collection instructing component 136 at the virtualizing storage controller 120 can then be modified to consider clusters of extents which are related and can base the fitness of a given cluster compared to another cluster on the amount of resources which may be released. A migration instructing component 137 at the virtualizing storage controller 120 can be modified to consider the clusters of extents when instructing migration of storage extents.

According to one embodiment, in the event that a storage system is low on logical capacity (e.g., the raw numbers of extents presented to the storage controller), garbage collection may choose to collect based on a conventional existing algorithm: defragmenting the extents with the least amount of used capacity, regardless of deduplication behavior.

According to one embodiment, in the event that the storage controller is low on physical capacity (e.g., the deduplicating backend storage controller 140 may be getting to the stage where it is low on capacity), the constructed extent relationship graph at the virtualization layer 130 may be leveraged to identify which clusters are the cheapest to collect in order to maximize the amount of capacity being reclaimed on the backend storage controller 140 or which are the most effective to migrate from one array to another.

For migration of storage extents, the constructed graph at the virtualization layer 130 may be leveraged to determine which extents in a given managed disk strongly deduplicate against one another. From this, it is possible to know which extents are desirable to migrate off an array. It is not desired to migrate extents which are highly deduplicated against in the case of migration to relieve stress on physical capacity as large numbers of extents will need to be migrated for there to be any meaningful benefit.

Figure 2:
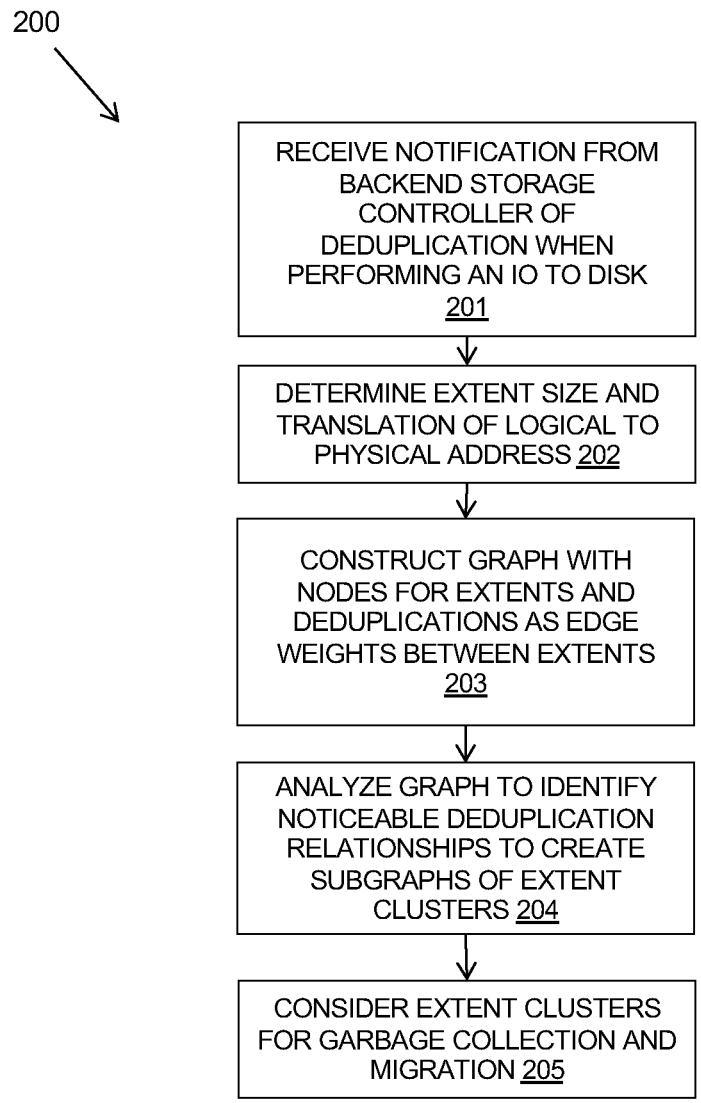
FIG. 2 is an operational flowchart illustrating a process for providing backend deduplication awareness to a virtualizing layer according to at least one embodiment.

Referring to FIG. 2, a flow diagram 200 shows an example embodiment of a process for providing backend deduplication awareness to the virtualizing layer. The backend deduplication awareness process may be carried out at a deduplication awareness component 135 at the virtualizing storage controller 120, as illustrated in FIG. 1

At 201, a notification is received from a backend storage controller of deduplication information when performing an IO to a physical address at a disk. This may provide information on added deduplications and removed deduplications.

In one embodiment, issuing an IO may result in whether or not that IO was subject to deduplication being returned in the status details. In this embodiment, the act of deduplicating may be synchronous.

In another embodiment, the backend storage controller may process IOs as normal and may send a secondary message back to the virtualization layer when a deduplication action occurs.

The details required of the virtualization layer from the backend may include: "A deduplication has occurred between X and Y". When a deduplication has been removed, an equivalent update message may be provided. The messages may be batched to optimize bandwidth between the systems.

When a write occurs that results in a deduplication on the backend, a notification may update the virtualization layer of what address on the backend disk was deduplicated against what other address. Based on this, the virtualization layer may determine what extents are associated with one another.

When an overwrite occurs on the backend resulting in a deduplication relationship ending (e.g., a given address is no longer referencing another location), the virtualization layer may be updated with what relationship has been removed. Based on this, the virtualization layer can decrement the association between one extent and the other.

When an IO is performed, if the deduplicating storage layer recognizes that the owner of this IO owns the storage which the reference is deduplicated against, it can notify the issuer that a deduplication has been created and the associated physical address.

According to one embodiment, data reduction pools may be created in order to use data reduction techniques. In a data reduction pool, it may be common to write IOs to new locations on the backend and to rely on garbage collection to create new, contiguous ranges on the backend. As an IO is performed to disk, there is a notification by the backend storage controller that these have deduplicated to other ranges. The other ranges may or may not be in the pool, dependent on the configuration; however, for simplicity, only those in the pool are considered in this example.

Then at 202, a translation of the physical to logical address is determined. In one embodiment, at 202, the virtualization layer may know or determine the extent size and how to translate the physical to logical addresses.

In a virtualizing storage controller, each virtualized extent may functionally point to a backend extent. This allows a virtual/logical address to be translated from physical addresses and vice versa. In one embodiment, this may be in the form of a table mapping extents that belong to a given volume to the associated backend extents and performing a reverse lookup.

When a read is performed from the backend, the logical address is fed into the table to determine an extent offset needed to look up based on the extent size. The backend extent will then be available at that offset.

In the context of the described embodiments, extents are a helpfully granular and a useful unit to track interactions between ranges on the backend storage. In one embodiment, extents may also provide a unit of garbage collection and migration in data reduction pools, so they work well as a unit tracking these interactions.

Then at 203, a graph is constructed with nodes for storage extents and deduplication edge weights between extents representing deduplications between the extents.

In one embodiment, the graph may also be constructed to include an indication of the fullness of the extent. This may be constructed from garbage collection details for a given extent. For a data reduction pool extent, there are estimates as to how much of the extent is functionally free as part of the garbage collection details collected for the pool. For fully allocated volumes, it is assumed that these ranges are all in use and are not subject to garbage collection.

The graph construction at 203 may be dynamically updated to include changing deduplication edge weights on the graph. The graph may also be dynamically updated to include changes in the fullness of extents.

Then at 204, the graph is analyzed to identify noticeable deduplication relationships to create subgraphs of extent clusters. In one embodiment, the graph is analyzed to identify subgraphs representing clusters of storage extents suitable for garbage collection or migration. The graph's deduplication edge weights may be used identify subgraphs below a configured size that are disconnected from the rest of the graph.

The graph may be analyzed at 204 for garbage collection by identifying clusters of storage extents with a strong deduplication relationship to reclaim physical capacity. To construct an algorithm which intends to reclaim physical capacity, thresholds may be applied to only consider noticeable deduplication relationships. Once this has been done, subgraphs are identified which are tractable to process. The aim is to determine which subgraphs are isolated from the rest of the graph. Large subgraphs are disqualifying, as large numbers of extents will need to be collected in order to recover large amounts of capacity anyway. Therefore, in one embodiment, the aim is identification of small subgraphs that are disconnected from the rest of the graph.

In order to efficiently analyze this graph, subgraphs are identified for which the total deduplication edge weight extends beyond a certain level. The complexity of the graph may be reduced by applying a threshold either as a raw value or as a percentage of the total deduplications.

According to one embodiment, it may not be feasible to consider all possible subgraphs efficiently. In one example, if there is a graph with n nodes and $n^2$ edges, the possible subgraphs that are present can be constructed by taking the graph, numbering the edges, and choosing to turn them off or on based on a binary count. As such, there may be $2^{n^2}$ possible subgraphs to consider. This may be intractably large for anything other than the simplest graph. Thus, it is desirable to restrict maximal subgraph size and focus on the behavior of individual nodes rather than perfect cluster identification. Embodiments of this process may therefore identify subgraphs below a configured size.

Then at 205, the extent clusters are considered for garbage collection and migration. In one embodiment, analyzing the graph for migration may determine storage extents of a given managing disk that strongly deduplicate and selecting storage extents for migration which are not highly deduplicated against. In one embodiment, the resultant clustered storage extents represented by nodes in the subgraphs may be considered for garbage collection or migration.

The clustered storage extents may also be considered to determine out-of-order unmap commands to issue to free up capacity on the backend storage controller for invalidated ranges in a manner that maximizes the change of backend capacity being freed.

Figure 3:
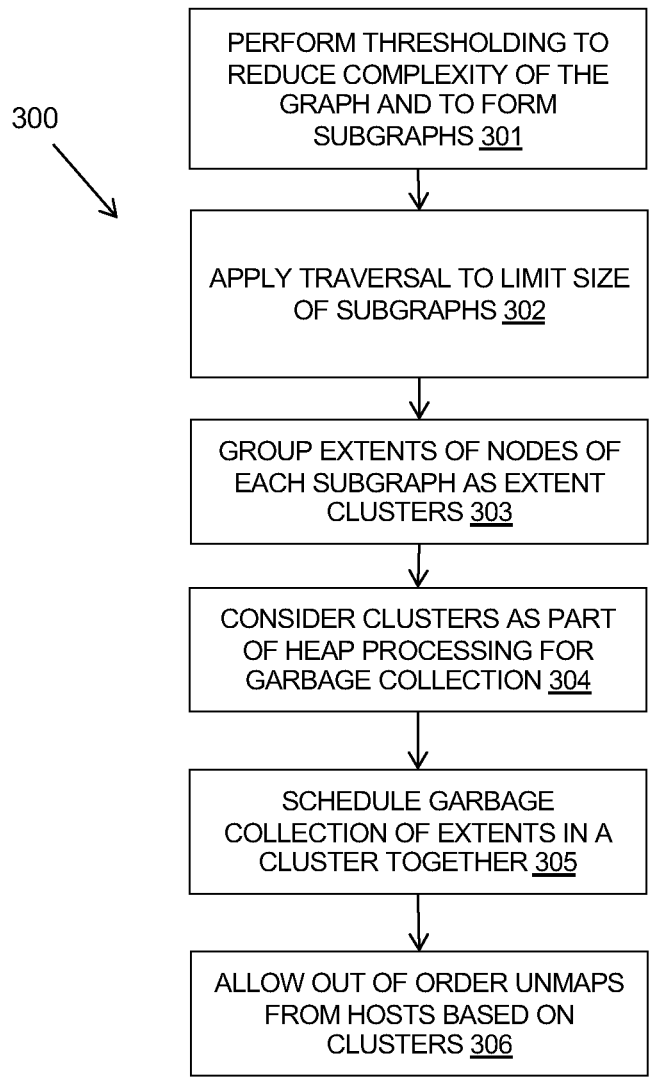
FIG. 3 is an operational flowchart illustrating an aspect of the process of FIG. 2 according to at least one embodiment.

Referring to FIG. 3, a flow diagram 300 illustrates an example embodiment of an aspect of the processing of the constructed graph of nodes representing extents of storage for garbage collection.

At 301, a thresholding is performed to reduce the complexity of the graph and to form subgraphs. In one embodiment, the thresholding may be performed if required to reduce the complexity of the graph. This may include removing some of the low value deduplication edge weights to leave noticeable deduplication relationships as subgraphs. This thresholding process may also eliminate full extents or nodes connected to full extents from consideration. In one embodiment, this graph simplification process may be partly optional. The graph simplification process may enable removing clusters of extents that are not very desirable for garbage collection. If garbage collection is performed on an extent that is highly tied to another deduplicated extent, there may not be any real space savings on the backend storage. This is in order to make the problem be further tractable for garbage collection.

Then at 302, a graph traversal algorithm is applied to each subgraph to limit a size of the subgraphs to be considered. In one embodiment, the size of the subgraphs may be considered as a function of the fullness of the storage extents. The traversal algorithm may identify nodes at least given distance away from any given node, for example, at least two edges away from any given node in the graph. This determines how many nodes can be accessed from a given node. For example, the traversal algorithm may be a breadth-first search or a depth-first search.

For each node, the process may identify the number of nodes which have immediate connections to a given node. For a sparse graph due to the thresholding step having been carried out, this may be a relatively quick process. If the graph is dense, a cut-off may be applied beyond a certain point as a highly connected extent is going to require a large number of extents processed in order for it to be efficiently collected.

If subgraph analysis is performed after-the-fact (e.g., in response to out-of-band deduplication changing weights on the graph), the maximum number of edges traversed may be a function of the virtual-layer's garbage collection quality of the extent. In other words, it may be acceptable to look at more nodes for an emptier extent. Various mechanisms can be used to make this more or less efficient, with the overall aim being the identification of disconnected subgraphs on the constructed graph.

Then at 303, extents of nodes of each subgraph are grouped as extent clusters. At the end of 302, an extent should exist as part of exactly one subgraph, or be part of a subgraph considered too expensive to process. These subgraphs are then grouped together at 303 and the groups are referred to as extent clusters.

Then at 304, clusters are considered as part of heap processing for garbage collection. In one embodiment, clusters may be considered as part of heap processing to select the optimal extents based on what is going to be the cheapest to collect, e.g., the emptiest extents. In one embodiment, the fitness of an extent cluster may consider the fitness of all entries within it. The fitness is may be a function of a resource capacity (e.g., physical or logical capacity) which will be reclaimed versus how much IO is necessary to do so.

Then at 305, garbage collection of extents in a cluster are scheduled together. In one embodiment, garbage collection may schedule extent clusters to be processed together at 305, and by doing this in a grouped fashion, the amount of physical capacity reclaimed from a given array may be optimized.

According to one embodiment, this mechanism may be made optional with normal migration or garbage collection mechanisms used when physical capacity is not under stress and the clustered extents only used when required.

Then at 306, out-of-order unmaps from hosts are allowed based on clusters. As a further option, the constructed graph may combine garbage collection details of how full an extent may be to create a mechanism which allows an out-of-order unmap command (e.g., not associated with the collection of an extent) to issue at 306 to free up capacity on the backend storage controller for invalidated ranges, in a fashion which will maximize the chance of backend capacity getting freed. This may be carried out without the need to drip-feed unmap IOs for every overwrite on the virtualization layer, which are likely to not be concentrated across the physical domain.

In the described process, information may be made available regarding how much deduplication is ongoing on in the backend. Therefore, some unmap operations may be permitted to proceed to the backend. This could be combined with garbage collection details to determine if an extent is likely to be collected soon or not—if an extent is going to be collected there is no need to send small unmap operations down. Similarly, if a range is known to be heavily deduplicated, it may not be worthwhile issuing unmap operations down the stack as no space savings would be attained but more IOs would need to be processed.

In some cases, the backend disk will run out of physical capacity before the logical capacity it presents is filled. For example, this can happen if highly incompressible data is written to the backend. In these cases, the virtualization layer will recognize the backend disk is unable to manage much more capacity. In these cases, it will want to migrate extents to another backend array and vacate those extents on the overloaded storage controller.

The constructed graph of extents may also be analyzed and used for considering migration of extents. This may have different requirements to the garbage collection analysis of the graph. Migration may move isolated extents that are full and may not consider the garbage collection fullness details.

For migration analysis of the graph, only nodes on a given managed disk may be considered for a given stressed managed disk. From this, it may be determined which extent clusters are going to be most effective to migrate to another storage controller.

For the purposes of migration, if the aim is to move capacity from one backend disk to another (e.g., for the case where there is a new backend disk or an overloaded backend disk), it is be desirable to shift extents which deduplicate together, otherwise far less capacity would be freed up than would be expected as part of the migration.

Figure 4A:
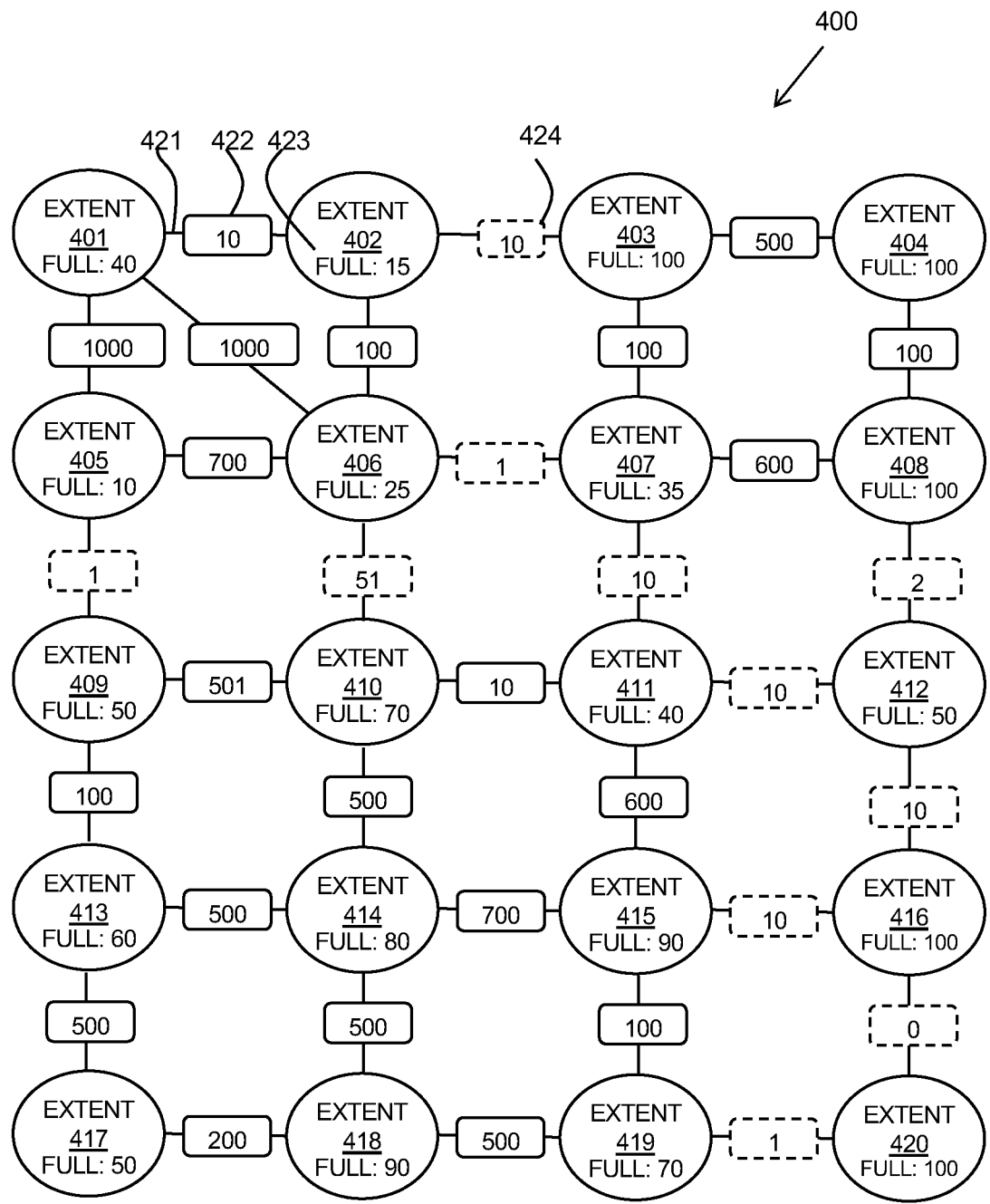
FIG. 4A is a schematic diagram illustrating a graph analysis of a constructed graph according to at least one embodiment.
Figure 4B:
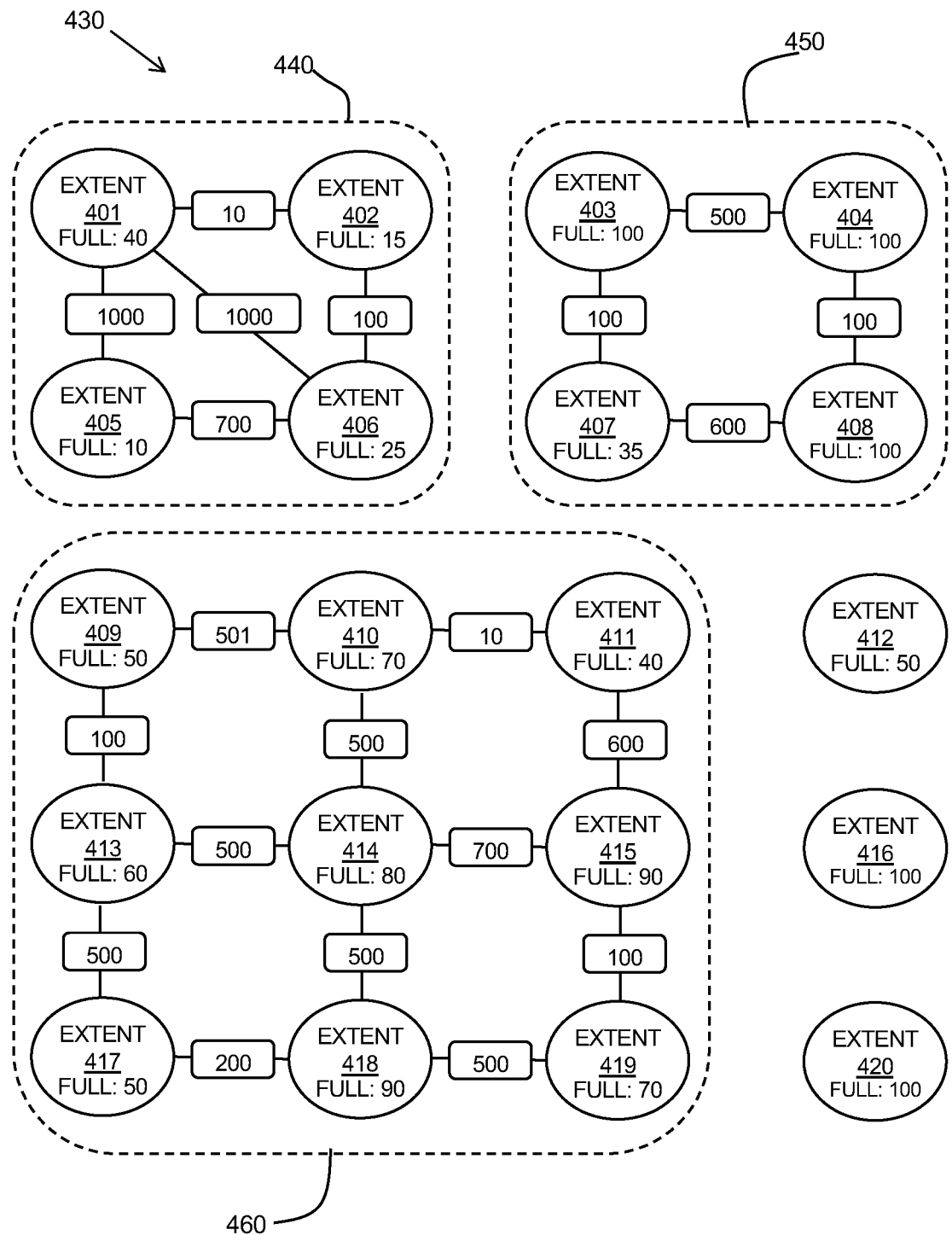
FIG. 4B is a schematic diagram illustrating a graph analysis of selected subgraphs according to at least one embodiment.

Referring to FIGS. 4A and 4B, schematic diagrams 400, 430 show a constructed graph in FIG. 4A and selected subgraphs 440, 450, 460 of clustered extents in FIG. 4B.

Each node 401-420 of the graph 400 of FIG. 4A represents a storage extent and includes an indication of the fullness 423 of the extent. Each edge 421 in the graph 400 between nodes 401-420 has a deduplication weighting 422 as notified by the backend storage controller.

A thresholding step is applied. This may include removing low value deduplication edge weights and FIG. 4A shows low value deduplication edge weights with hashed weighting boxes. This converts the graph into an initial set of disconnected subgraphs 440, 450, 460 as shown in FIG. 4B.

A graph traversal algorithm may evaluate all nodes in a graph by maintaining whether or not the traversal has visited a node yet on a graph. If all options are exhausted during traversal, a new traversal may be started from the set of unvisited nodes fairly easily. Based on this, the graph is grouped into the subgraphs 440, 450, 460 shown in hatching patterns in FIG. 4B. If the number of nodes visited by the traversal exceeds some threshold (e.g., 4), the traversal may be stopped and the subgraph may be considered as being too expensive to consider.

In this example, this may apply to the largest cluster 460 of 9 nodes. This largest cluster would not be considered if other options existed as there are many ties between many extents, thus capacity would only be freed up in the event that a large number of extents were moved. It would be preferable select a cheaper extent to garbage collect or migrate, if available.

In the case of garbage collection, garbage collection candidates may be reviewed and weighed collectively. For the first cluster 460, it can be seen that the extents are, on average, 22% full. Based on the number of deduplications between the extents, it can be estimated how much physical capacity will be freed when all of these are collected together. However, it is not necessarily known how much is deduplicated out of the capacity to be garbage collected versus the capacity to collect, so this is ultimately a heuristic.

The process is repeated for the second cluster 450, calculating the amount of space estimated to be freed versus the amount to be moved, and note that there is also an isolated node 412 with free capacity.

It can now be evaluated which of the clusters should be garbage collected first, in order to maximize the average amount of physical capacity to be reclaimed.

In the case of migration, for a managed disk which is space-stressed, the set of nodes corresponding to the managed disk can be evaluated to identify which clusters need to be migrated together in order to maximize the amount of physical capacity reclaimed. For migration, fully allocated extents, as well as data reduction extents, can be considered as part of the graph. Small clusters or isolated nodes are more beneficial to migrate for space reasons than other extents.

For migration using the example of FIG. 4B, the isolated extents may be migrated first. The clusters 440, 450 may then be considered for migration, as "fullness" here is from a data reduction pool's perspective on the virtualization layer and does not bare relevance to migration in most implementations.

An exception would be where migration is implemented through garbage collection —so that a given extent only moved data that was considered valid to another array—but this would only be the case for data reduction pool volumes in the virtualizing storage controller.

This concept can be trivially extended to factor in other behavior that may need to be represented on a per-extent basis. For example, the compressibility details of a given IO may be passed up from the storage controller, if these were available. This would allow migration and garbage collection on the virtualization layer to be more responsive to physical capacity demands on the backend.

Deduplicating drives pose a slight additional concern. A given write to the backend may result in deduplication being partial. For a given write, part of it may deduplicate and part of it may not. If an IO deduplicates on a 4K range of a 16K IO, a weight may still be assigned to the graph accordingly. Similarly, if one drive deduplicates to one location, and one to another, multiple deduplication relationships versus physical addresses may be updated in response to a single IO.

The described embodiments have the advantage of enabling migration and garbage collection selection with awareness of underlying deduplication relationship behavior on underlying storage media. This provides effective migration and garbage collection on deduplicating drives/arrays, especially to avoid out-of-physical capacity conditions.

While currently, it is most common to implement deduplication at the highest layer to maximize the deduplication database's search space, as deduplicating drive technology develops, it is probable that more of this work will be performed at the backend. Under such circumstances, thin provisioning at the virtualization layer may still be desirable (e.g., due to logical capacity constraints or heterogenous storage configurations/non-deduplicated storage still being present), so knowing what migration/garbage collection actions have the greatest utility will be desirable.

With conventional migration or garbage collection unaware of underlying deduplication relationships, migration is based on logical capacity, and thus not necessarily moving the best extents in the event that physical capacity is stressed.

In a log structured array (LSA), it is common that allocation occurs to fresh ranges for each write. An overwrite IO results in a chunk of storage being invalidated, and a fresh range being written to. The reason why this is desirable is that features such as compression do not necessarily result in overwrites fitting in the same location. Even if an overwrite results in less data being written to disk, there is then a small amount of wasted space that cannot easily be used for other writes.

The cost of performing an update must also be considered, which for some technologies requires a whole flash chip to be cycled, rather than just the range of data in question. Coalescing these writes is desirable, so always writing to fresh ranges, and leveraging garbage collection to migrate data from partly empty ranges may improve the lifetime of the media.

Garbage collection technologies tend to try to avoid migrating ranges for as long as possible. If an extent is partially empty, a workload may completely empty the remaining capacity of an extent, reducing the cost of garbage collection to zero. While this may be desirable, storage pressure may require the system to collect an extent before such a situation has occurred.

Garbage collection may issue unmap commands on a large granularity; for example, when extents are migrated. This improves the performance characteristics of storage as an overwrite need only register the invalidation in metadata rather than issue granular updates to underlying storage controllers. While a write may always be written to the sequential location under an LSA, the unmap command IO may have to be performed anywhere on the array. By waiting until an extent is collected, the work is coalesced, hopefully, more efficiently.

In a large storage pool, it is common to have multiple arrays implemented using different technologies (e.g., near-line; flash). Migration moves ranges of storage between these tiers as performance and capacity requirements demand.

Technologies such as deduplicating drives and always-on deduplicating storage controllers are either becoming more common or under development. The power of these technologies is to allow offloading of deduplication capabilities to internal hardware on the drives; however it does mean that determining whether or not an IO on an upper layer is going to free up physical capacity is not simple, which affects areas such as migration and garbage collection.

Figure 5:
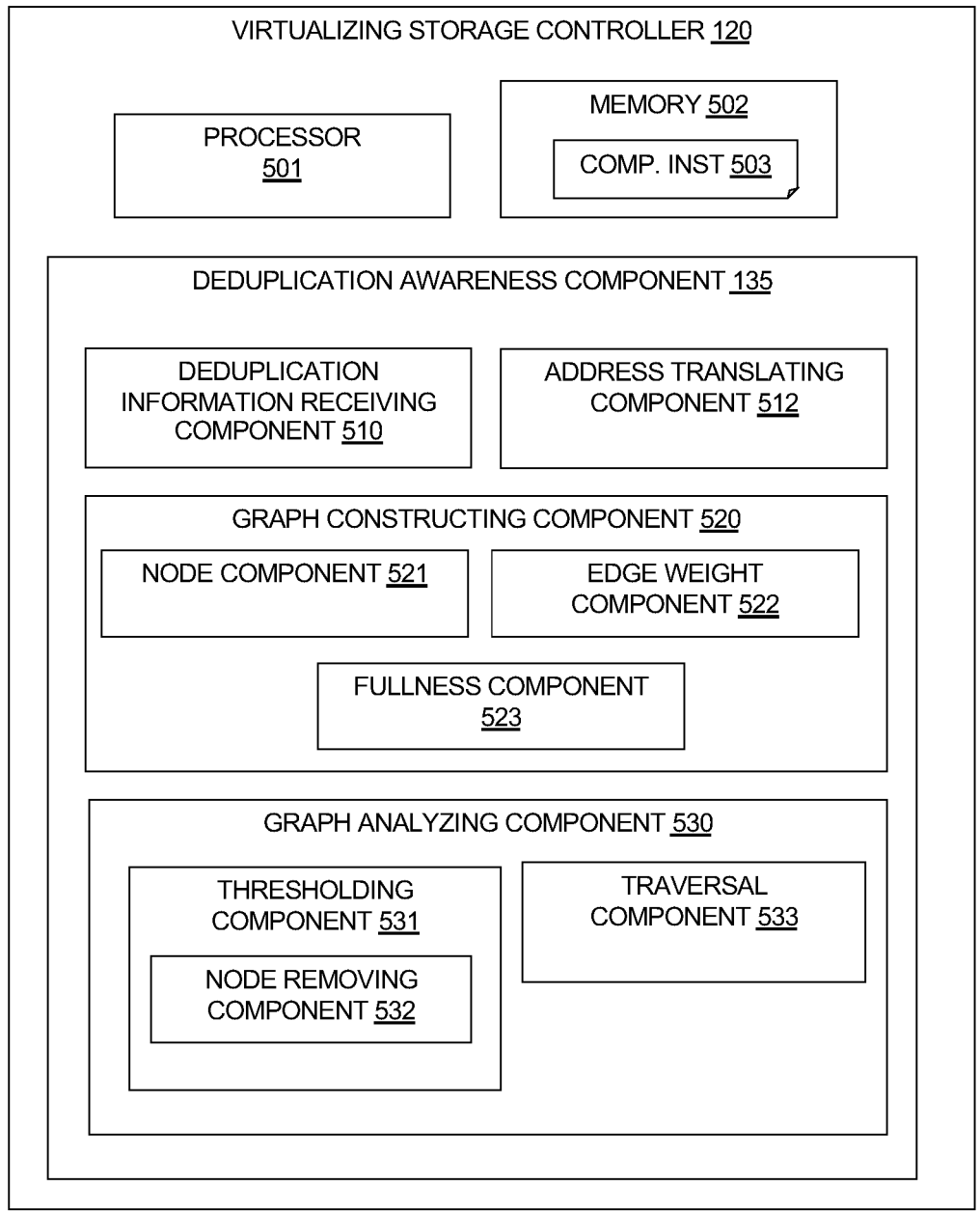
FIG. 5 is a block diagram of an example embodiment of a system in accordance with the present invention.

Referring to FIG. 5, a block diagram shows an example embodiment of a virtualization storage controller 120 including a deduplication awareness component 135.

The storage controller 120 includes at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The deduplication awareness component 135 may include a deduplication information receiving component 510 for receiving deduplication information from a backend storage controller when performing an IO operation to a physical address at a disk and an address translating component 512 for translating the physical to logical address to apply to storage extents in the virtualizing layer.

The deduplication awareness component 135 may include a graph constructing component 520 for constructing a graph with a node component 521 for providing nodes representing storage extents in the virtualizing layer and with a deduplication edge weight component 522 for providing edge weights representing deduplications between the extents. The graph constructing component 520 may optionally also include a fullness component 523 for providing an indication of a fullness of an extent represented by a node.

The deduplication awareness component 135 may include a graph analyzing component 530 for analyzing the constructed graph to identify subgraphs representing clusters of storage extents that are suitable for garbage collection or migration as a cluster.

The graph analyzing component 530 may include a thresholding component 531 for performing a thresholding to remove deduplication edge weights below a configured threshold deduplication edge weight to form initial subgraphs and a traversal component 533 for applying a subgraph traversal of the initial subgraphs to limit to a configured maximum size of a subgraph. The thresholding component 531 may include a node removing component 532 for removing nodes that indicate a full extent or nodes connected to nodes that indicate a full extent.

Figure 6:
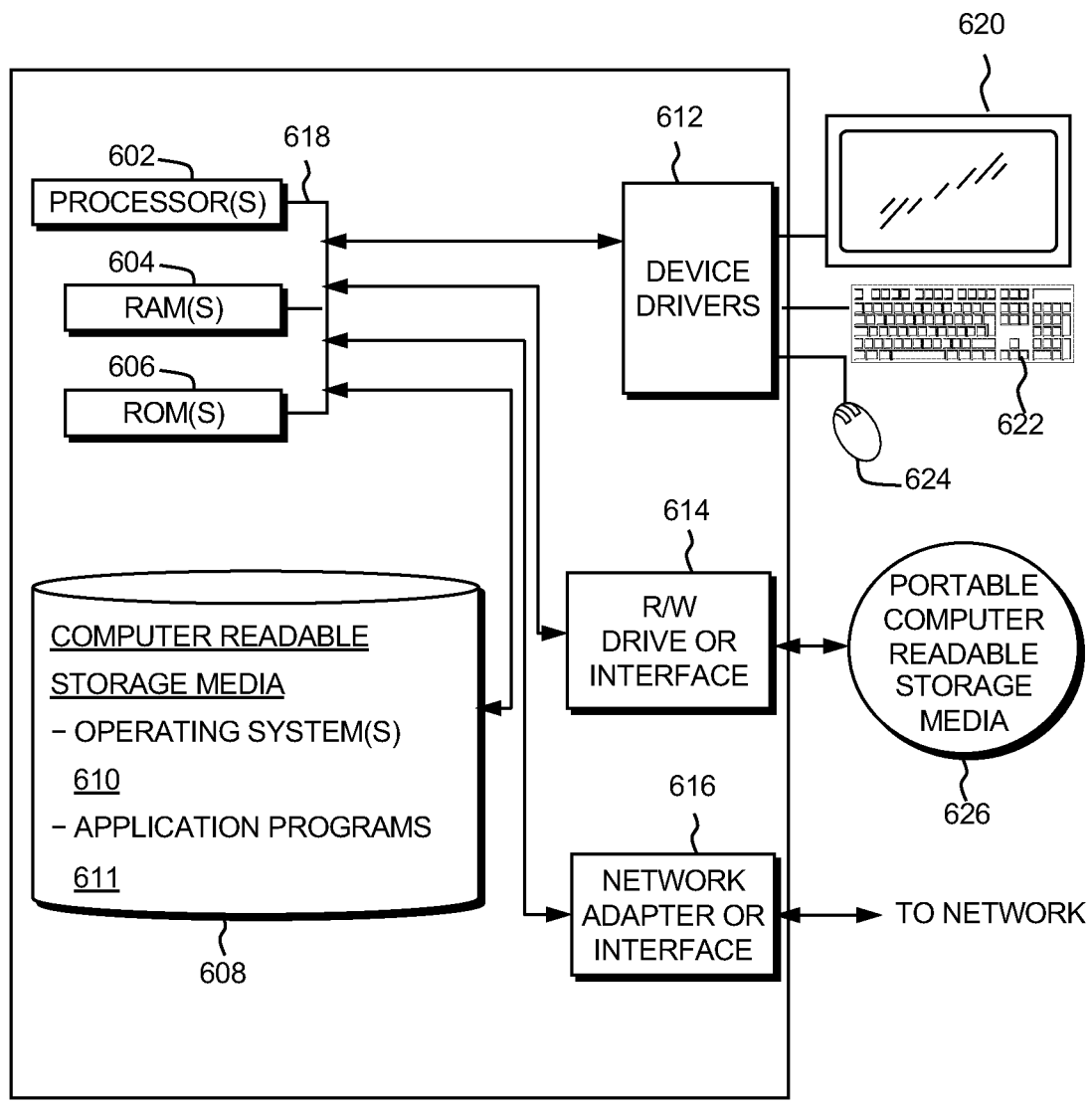
FIG. 6 is a block diagram of internal and external components of computers and servers depicted in the present disclosure according to at least one embodiment.

FIG. 6 depicts a block diagram of components of a computing system as used for the storage controllers 120, 140, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

The computing system can include one or more processors 602, one or more computer-readable RAMs 604, one or more computer-readable ROMs 606, one or more computer readable storage media 608, device drivers 612, read/write drive or interface 614, and network adapter or interface 616 (e.g., TCP/IP adapter cards, wireless wi-fi interface cards, or 3G, 4G, 5G wireless interface cards or other wired or wireless communication links), all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 614 to read from and write to one or more portable computer readable storage media 626. Application programs 611 on the computing system can be stored on one or more of the portable computer readable storage media 626, read via the respective R/W drive or interface 614 and loaded into the respective computer readable storage media 608.

The computing system can also include a network adapter or interface 616, such as a TCP/IP adapter card or wireless communication adapter. Application programs 611 on the computing system can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

The computing system can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
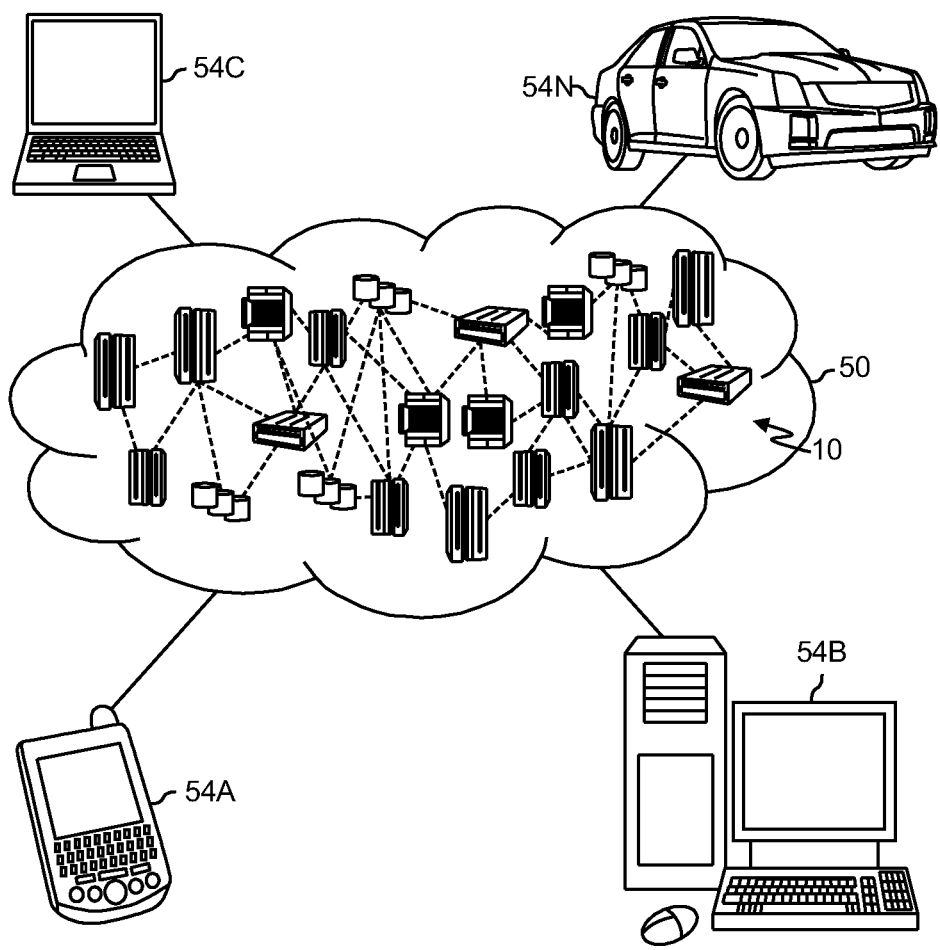
FIG. 7 is a block diagram of an illustrative cloud computing environment including the computer systems depicted in FIGS. 1 and 5, in accordance with an embodiment of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
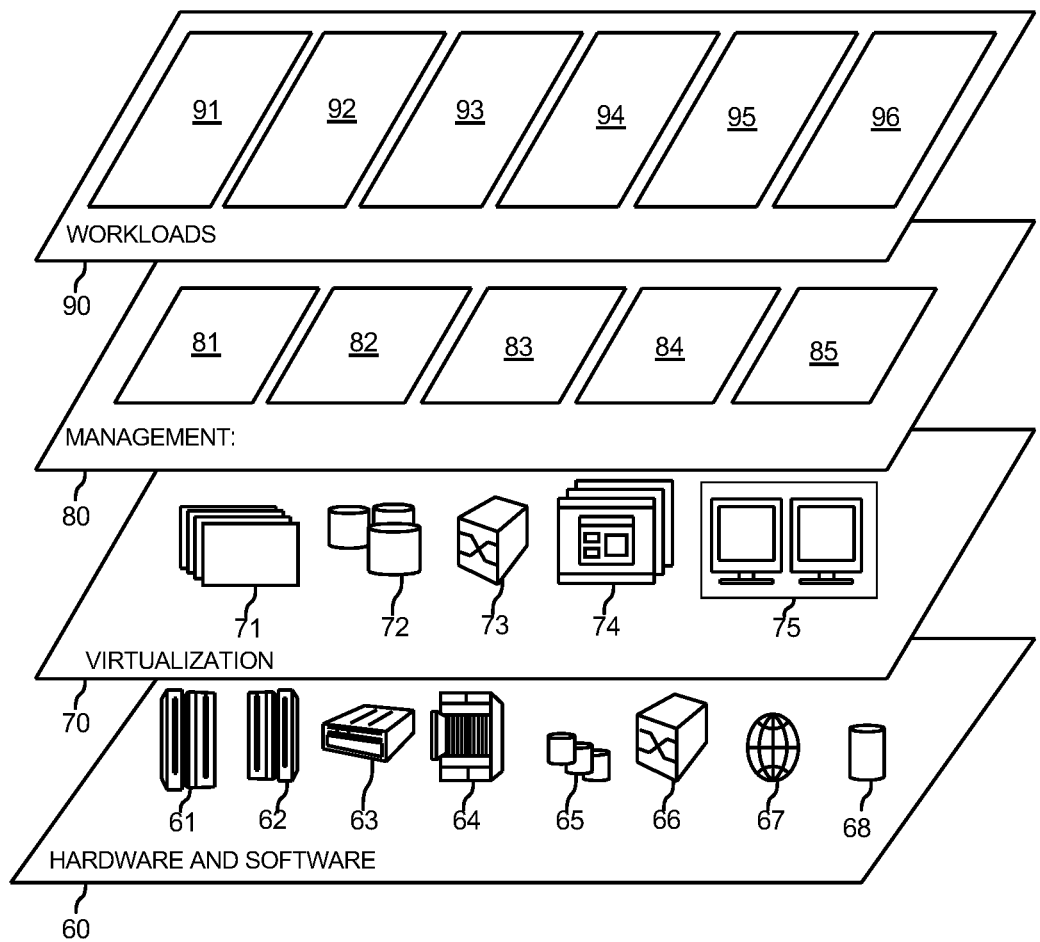
FIG. 8 is a block diagram of functional layers of the illustrative cloud computing environment of FIG. 7, in accordance with an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deduplication awareness processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method, comprising:
performing an input/output (IO) operation to a physical address of a disk;
receiving a deduplication information from a backend storage controller associated with the performed IO operation;
translating the physical address of the disk to a logical address to apply to a plurality of storage extents in a virtualizing layer;
constructing a graph including a plurality of nodes and a plurality of edges connecting the plurality of nodes, wherein each node of the plurality of nodes represents a respective storage extent of the plurality of storage extents in the virtualization layer, and wherein each edge of the plurality of edges connects two nodes and represents a deduplication relationship between two respective storage extents corresponding to the two nodes, wherein each edge includes a corresponding deduplication edge weight representing a number of deduplications between the two respective storage extents indicated by the backend storage controller; and
identifying at least one subgraph within the constructed graph, wherein the identified at least one subgraph includes a cluster of nodes connected by corresponding edges, wherein the cluster of nodes is disconnected from other nodes of the plurality of nodes in the constructed graph, wherein the identified at least one subgraph represents a storage extent cluster from the plurality of storage extents, wherein the storage extent cluster is selectable for garbage collection as a group.

2. The method of claim 1, wherein constructing the graph further comprises:
indicating, in each node, a fullness of the respective storage extent of the plurality of storage extents.

3. The method of claim 1, further comprising:
analyzing the constructed graph to identify the storage extent cluster including a strong deduplication relationship to reclaim physical capacity, wherein the strong deduplication relationship indicates a total deduplication edge weight of the storage extent cluster exceeding a threshold level.

4. The method of claim 1, further comprising:
analyzing the constructed graph to consider the storage extent cluster as part of a heap processing based on a function of a resource capacity that can be reclaimed versus an amount of IO operation processing necessary to reclaim the resource capacity.

5. The method of claim 1, wherein analyzing the constructed graph further comprises:
performing a thresholding to remove any deduplication edge weights below a configured threshold deduplication edge weight to form an initial subgraph of the identified at least one subgraph; and
applying a subgraph traversal to the initial subgraph to limit a configured maximum size of the identified at least one subgraph.

6. The method of claim 5, wherein analyzing the constructed graph further comprises:
removing any nodes of the plurality of nodes that indicate a full respective storage extent.

7. The method of claim 5, wherein analyzing the constructed graph further comprises:
removing any nodes of the plurality of nodes that are connected to the other nodes of the plurality of nodes that indicate a full respective storage extent.

8. The method of claim 2, wherein analyzing the constructed graph further comprises:
applying a configured maximum size of the identified at least one subgraph as a function of the fullness of the plurality of storage extents of the identified at least one subgraph.

9. The method of claim 8, further comprising:
analyzing the constructed graph in response to an out-of-band deduplication changing weights in the constructed graph.

10. The method of claim 1, further comprising:
analyzing the constructed graph for migration of the storage extent cluster, wherein analyzing the constructed graph for migration includes considering a set of nodes of a given managed disk that are stressed and determining which of the plurality of storage extents of the given managed disk deduplicates together.

11. A computer system for providing backend deduplication awareness at a virtualizing layer, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
performing an input/output (IO) operation to a physical address of a disk;
receiving a deduplication information from a backend storage controller associated with the performed IO operation;
translating the physical address of the disk to a logical address to apply to a plurality of storage extents in a virtualizing layer;
constructing a graph including a plurality of nodes and a plurality of edges connecting the plurality of nodes, wherein each node of the plurality of nodes represents a respective storage extent of the plurality of storage extents in the virtualization layer, and wherein each edge of the plurality of edges connects two nodes and represents a deduplication relationship between two respective storage extents corresponding to the two nodes, wherein each edge includes a corresponding deduplication edge weight representing a number of deduplications between the two respective storage extents indicated by the backend storage controller; and
identifying at least one subgraph within the constructed graph, wherein the identified at least one subgraph includes a cluster of nodes connected by corresponding edges, wherein the cluster of nodes is disconnected from other nodes of the plurality of nodes in the constructed graph, wherein the identified at least one subgraph represents a storage extent cluster from the plurality of storage extents, wherein the storage extent cluster is selectable for garbage collection as a group.

12. The computer system of claim 11, wherein constructing the graph further comprises:
indicating, in each node, a fullness of the respective storage extent of the plurality of storage extents.

13. The computer system of claim 11, further comprising:
analyzing the constructed graph to identify the storage extent cluster including a strong deduplication relationship to reclaim physical capacity, wherein the strong deduplication relationship indicates a total deduplication edge weight of the storage extent cluster exceeding a threshold level.

14. The computer system of claim 11, further comprising:
analyzing the constructed graph to consider the storage extent cluster as part of a heap processing based on a function of a resource capacity that can be reclaimed versus an amount of IO operation processing necessary to reclaim the resource capacity.

15. The computer system of claim 11, wherein analyzing the constructed graph further comprises:
performing a thresholding to remove any deduplication edge weights below a configured threshold deduplication edge weight to form an initial subgraph of the identified at least one subgraph; and
applying a subgraph traversal to the initial subgraph to limit a configured maximum size of the identified at least one subgraph.

16. The computer system of claim 15, wherein analyzing the constructed graph further comprises:
removing any nodes of the plurality of nodes that indicate a full respective storage extent.

17. The computer system of claim 15, wherein analyzing the constructed graph further comprises:
removing any nodes of the plurality of nodes that are connected to the other nodes of the plurality of nodes that indicate a full respective storage extent.

18. A computer program product for providing backend deduplication awareness at a virtualizing layer, comprising:
one or more computer-readable storage media and program instructions collectively stored on the one or more computer-readable storage media, the program instructions executable by a processor to cause the processor to perform a method comprising:
performing an input/output (IO) operation to a physical address of a disk;
receiving a deduplication information from a backend storage controller associated with the performed IO operation;
translating the physical address of the disk to a logical address to apply to a plurality of storage extents in a virtualizing layer;
constructing a graph including a plurality of nodes and a plurality of edges connecting the plurality of nodes, wherein each node of the plurality of nodes represents a respective storage extent of the plurality of storage extents in the virtualization layer, and wherein each edge of the plurality of edges connects two nodes and represents a deduplication relationship between two respective storage extents corresponding to the two nodes, wherein each edge includes a corresponding deduplication edge weight representing a number of deduplications between the two respective storage extents indicated by the backend storage controller; and
identifying at least one subgraph within the constructed graph, wherein the identified at least one subgraph includes a cluster of nodes connected by corresponding edges, wherein the cluster of nodes is disconnected from other nodes of the plurality of nodes in the constructed graph, wherein the identified at least one subgraph represents a storage extent cluster from the plurality of storage extents, wherein the storage extent cluster is selectable for garbage collection as a group.

* * * * *